Oct. 27, 1970  P. V. DE LUCA  3,535,776

METHOD OF MANUFACTURING A MULTI-SEGMENT COMMUTATOR

Filed Nov. 4, 1968

United States Patent Office 3,535,776
Patented Oct. 27, 1970

3,535,776
METHOD OF MANUFACTURING A MULTI-SEGMENT COMMUTATOR
Paul V. De Luca, Port Washington, N.Y., assignor to Collectron Corporation, New York, N.Y.
Filed Nov. 4, 1968, Ser. No. 773,247
Int. Cl. H01r 43/00
U.S. Cl. 29—597                 1 Claim

ABSTRACT OF THE DISCLOSURE

The method of making a multi-segment commutator including the steps of providing a circular eyelet element including at least one radial flange member and a cylindrical flange member interconnected therewith at mutually abutting edges, cutting said radial flange member through at as many intervals as there are required segments such that said radial flange member is held together solely by interconnection with said cylindrical flange member, insert molding said eyelet element within a cylindrical insulative housing which encloses said cylindrical flange member, and at least partially encloses said radial flange member, and machining a surface of said housing to a degree sufficient to electrically separate said segments and simultaneously expose a finished conductive surface on said cylindrical flange member.

---

This invention relates generally to the field of electrical commutators and rotary switches used for encoding purposes, and more particularly to an improved method for manufacturing multi-segment commutators, in which each of the segments is electrically insulated from the others.

Using prior art methods, it is normal to provide a slip ring and a segmented insert which are soldered together. Several of such multi-piece parts are then molded, the outside of the assembly is milled to provide exposed contact lugs, and inner surface is polished to provide for brush contact.

It is among the principal objects of the present invention to simplify the above method to provide a substantial economic advantage in producing the structure.

Another object of the invention lies in the provision of a special eyelet as a basic part of an assembled device which eliminates the necessity of soldering the metallic parts together prior to insert molding within a housing which encloses said parts.

A further object of the invention lies in the provision of a method for manufacturing a multi-segment commutator in which machining operations have been reduced to a minimum.

These objects, as well as other incidental ends, and advantages, will more fully appear in the progress of the following disclosure, and be pointed out in the appended claims.

In the drawing, to which reference will be made in the specification, similar reference characters have been employed to designate corresponding parts throughout the several views.

Figure 1:
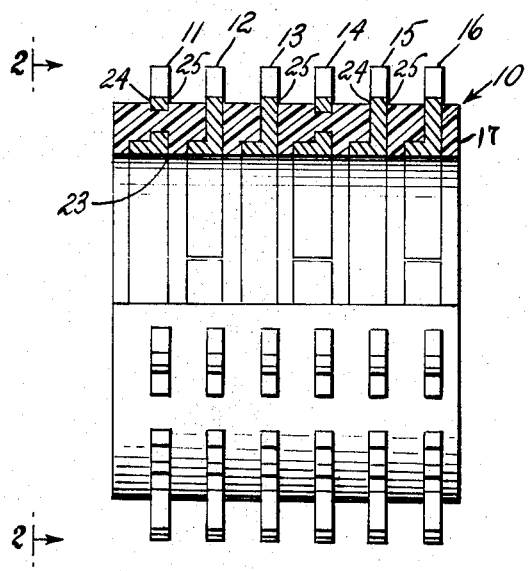
FIG. 1 is a view in elevation, partly in section of a completed commutator made in accordance with the disclosed method.
Figure 2:
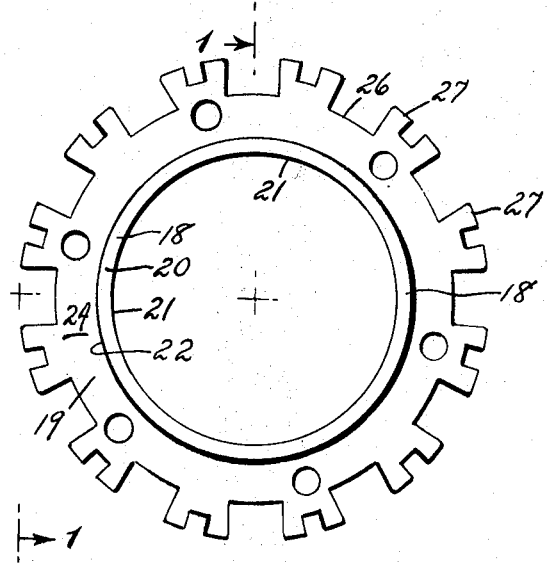
FIG. 2 is an end elevational view of one of the eyelet elements comprising a part of the embodiment.
Figure 3:
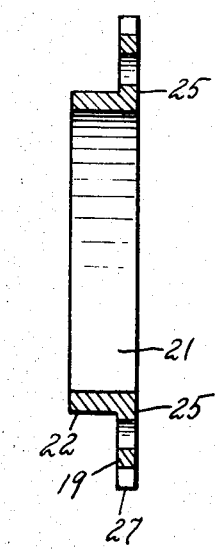
FIG. 3 is a longitudinal central sectional view of an eyelet element.

In accordance with the invention, there is illustrated in the drawing a completed device, generally indicated by reference character 10. The device 10 comprises broadly: A first plurality of eyelet or ring elements 11, 13 and 15, and a second plurality of eyelet or ring elements 12, 14 and 16 which are insert molded within a tubular synthetic resinous body or housing 17.

The first plurality of eyelet elements are similar, each including a cylindrical flange member 18 and a radial flange member 19.

The cylindrical flange member 18 is bounded by an edge surface 20, an inner surface 21, an outer surface 22, and is interconnected by a bend portion 23 to the radial flange member 19. The flange member 19 is bounded by first and second surfaces 24 and 25, respectively, and an outer edge surface 26 from which extend a plurality of projecting contact lugs 27.

Figure 4:
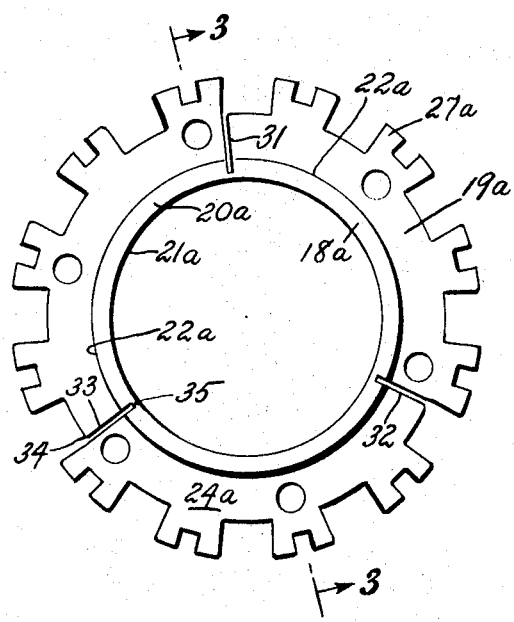
FIG. 4 is a view in elevation of a second eyelet element forming a part of the disclosed embodiment.

The second plurality of eyelet elements are generally similar, and are distinguished in the provision of radially extending cuts 31, 32 and 33 which segment the radial flange member 19a, as best seen in FIG. 4. The cuts extend from an outer end 34 and the outer edge 26a and extend to an inner end 35 disposed radially inwardly of the outer surface 22a.

The device 10 is assembled by positioning the eyelet elements 11–16 for insert molding as shown in FIG. 4, wherein the cylindrical flange members 18–18a are completely enclosed within the molding material forming the body 17, and the lugs 28 project outwardly from the outer surface thereof. After curing, the outer surface 28 is cleaned of flashing, and the inner surface is machined by boring to completely separate the individual segments. The elements 11, 13 and 15 then form continuous commutator rings, while the elements 12, 14 and 16 form commutator segments in the number required.

It will be observed that aside from the cleaning and flashing from the outer surface of the body 17, only one machining operation is required after molding to complete the device. This is true irrespective of the number of ring elements employer, and, if desired, several devices 10 may be formed simultaneously in a long mold (not shown) to be radially severed after the molding and machining operation.

I wish it to be understood that I do not consider the invention limited to the precise details of structure shown and set forth in this specification, for obvious modifications will occur to those skilled in the art to which the invention pertains.

I claim:

1. The method of making a multi-segment commutator comprising the steps of: providing a first plurality of eyelet elements of conductive material, each including a radially extending flange member and a cylindrical flange member interconnected thereto at abutting edges thereof, cutting each of said radial flange members through to a point where a plurality of planar segments thereof are formed, maintained in integral condition solely by interconnection with said cylindrical flange member, as many times as there are required segments; providing a second plurality of similar eyelet elements in uncut form, forming a group of eyelet elements including alternate cut and uncut eyelets aligned along a common principal axis, and in mutually axially-spaced relation; insert molding said first and second pluralities of eyelet elements within an insulative cylindrically-shaped housing to substantially enclose the cylindrical flange members of each of said eyelet elements, and only partially enclose said radial flange members of each of said eyelet elements, leaving the outer peripheries thereof exposed; and machining an interior cylindrical surface of said housing to expose and finish a plurality of conductive surfaces, and electrically separate said segments.

References Cited

UNITED STATES PATENTS

| | | | |
|---|---|---|---|
| 1,578,793 | 3/1926 | Apple | 29—597 X |
| 3,005,920 | 10/1961 | Dolza | 29—97 X |
| 3,010,182 | 11/1961 | Quinlan | 29—597 |
| 3,011,041 | 11/1961 | Bakels | 29—597 X |
| 3,151,384 | 10/1964 | Blabaum et al. | 29—597 |
| 3,182,217 | 5/1965 | Quinn | 29—597 X |
| 3,251,120 | 5/1966 | Reisnecker | 29—597 |

JOHN F. CAMPBELL, Primary Examiner

C. E. HALL, Assistant Examiner

U.S. Cl. X.R.

29—630; 310—42, 43, 232, 235, 236; 339—5